United States Patent [19]
Dolin, Jr.

[11] Patent Number: 5,192,231
[45] Date of Patent: Mar. 9, 1993

[54] POWER LINE COMMUNICATIONS COUPLER

[75] Inventor: Robert A. Dolin, Jr., Menlo Park, Calif.

[73] Assignee: Echelon Corporation, Palo Alto, Calif.

[21] Appl. No.: 679,153

[22] Filed: Mar. 26, 1991

Related U.S. Application Data

[63] Continuation of Ser. No. 540,584, Jun. 19, 1990, abandoned.

[51] Int. Cl.⁵ .............................................. H01R 13/66
[52] U.S. Cl. ..................................... 439/620; 361/111
[58] Field of Search ........................ 361/111; 439/620

[56] References Cited

U.S. PATENT DOCUMENTS

| | | | |
|---|---|---|---|
| 3,439,308 | 4/1969 | Swartout | 439/105 |
| 3,629,662 | 12/1971 | Cattey et al. | 439/620 |
| 4,126,369 | 11/1978 | Rapata et al. | 439/620 |
| 4,178,617 | 12/1979 | Reichel | 361/111 |
| 4,239,319 | 12/1980 | Gladd et al. | 439/620 |
| 4,428,633 | 1/1984 | Lundergan et al. | 439/620 |

FOREIGN PATENT DOCUMENTS

| | | | |
|---|---|---|---|
| 2146847 | 3/1973 | Fed. Rep. of Germany | 439/620 |
| 2255527 | 5/1973 | Fed. Rep. of Germany | 439/620 |

*Primary Examiner*—Gary F. Paumen
*Attorney, Agent, or Firm*—Blakely, Sokoloff, Taylor & Zafman

[57] ABSTRACT

A coupler for providing coupling for power line communications between the power lines carrying different phases of the power. The coupler engages an ordinary wall outlet such as 220 volt outlet and includes a receptacle for a 220 volt plug. Internally, the adaptor has high frequency coupling between the power lines. The coupling presents a high impedance to the power signal.

4 Claims, 1 Drawing Sheet

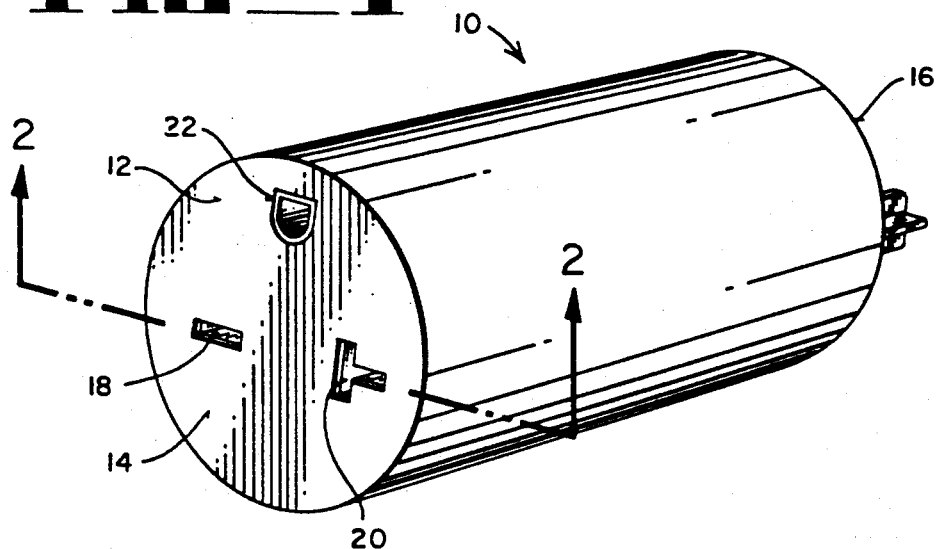
FIG_1
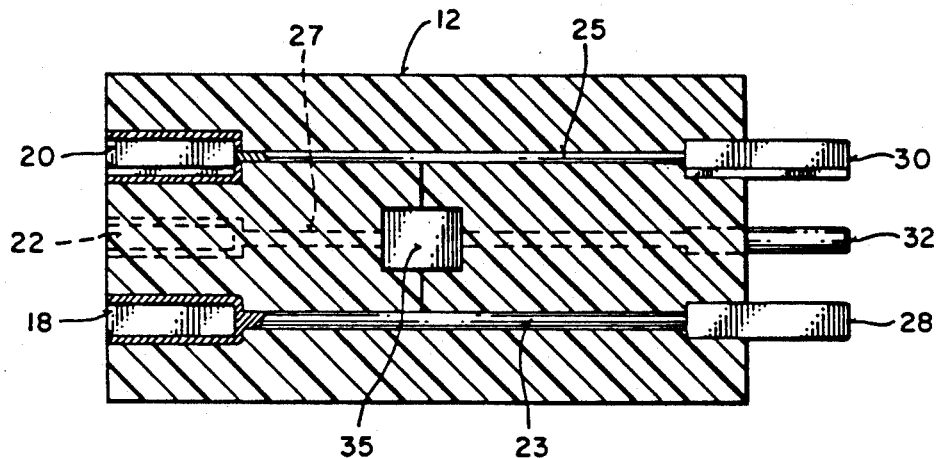
FIG_2
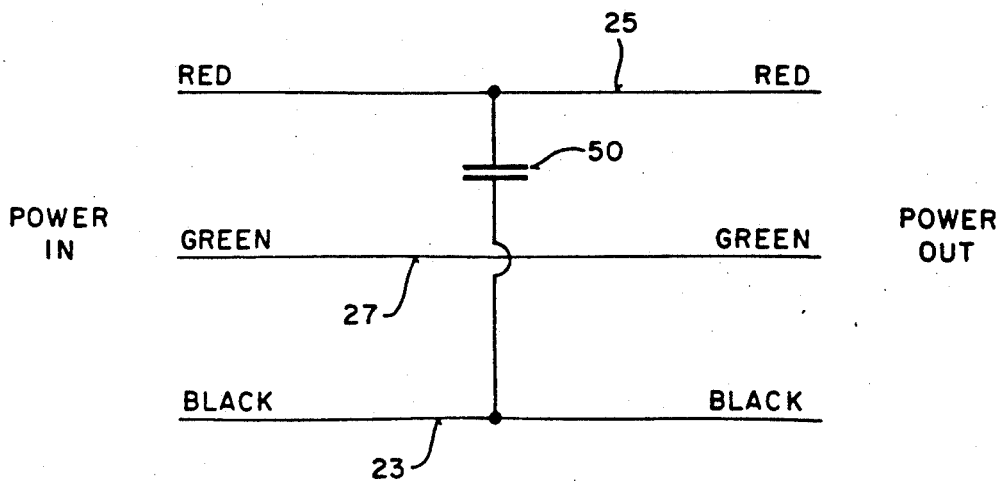
FIG_3

POWER LINE COMMUNICATIONS COUPLER

This is a continuation of application Ser. No. 07/540,584 filed Jun. 19, 1990, now abandoned.

BACKGROUND OF THE INVENTION

1. Field of the Invention

This invention relates to the fields of networks with distributed intelligence, for providing, control and communication through electrical power lines in houses and businesses, and more particularly, to electrical coupling of communication in such network. This field is sometimes referred to as power line communications (PLC).

2. Prior Art

There are commercially available products and proposed systems which permit intelligent networking of a control device to other devices through the power lines in a house, business, manufacturing facility, or the like (collectively referred to herein as households). Often these devices are coupled into standard wall sockets, light switches, or the like and send signals through the power wiring of such households to a receiving device coupled into a socket or otherwise connected to the household wiring. Such signals would be, for example, a command to turn on or off a lamp, television or other appliance.

These devices operate, in general, on the principle of sending a coded message or signal to a receiving device at a high frequencies relative to the frequency of alternating current. (Standard alternating current operates at 60 Hz in North America, and 50 Hz in many other parts of the world.) In comparison, the PLC transmit signals in a substantially higher range, as is known in the art. Such devices utilize signals greater than 1 KHz and typically in the 5 to 150 KHz range at the present time. Accordingly, in theory (and in theory only) there is little or no interference between the electrical power system and the communications system. One of the systems for providing communications and control is described in U.S. Pat. No. 4,918,690. Another system is sold by BSR under the trademark X-10.

Small domestic consumers of electricity are usually supplied with single phase power which comprises two power lines 180° out of phase with respect to each other, and a neutral (white coded wire). There is also a ground line (green coded wire or a bare wire) which is connected to the neutral wire at the power service entrance. Each of the two power lines carries approximately 110 to 120 volts with respect to the neutral line, and since the lines run 180° out of phase, the total voltage across the two power lines is 220 volts (assuming 110 volts and not 120 volts is present on each of the power lines with respect to neutral). In wiring standard households and small businesses an attempt is usually made to place one half the 110 volt load on each of the power lines. This is simply done by running one of the two power lines and the neutral line to approximately one half of the outlets and light fixtures, and the other power line and the neutral line to the other half of the outlets and light fixtures. As a result, any one 110 volt outlet, light switch or light fixture is only in communications with one of the two power lines, and the neutral line. (There is a link between the two 110 volts lines at the power transformer feeding the household, but this is not adequate for typical PLC.) Most houses and businesses also have 220 volt outlets for certain appliances such as dryers and ranges. The two power lines along with the ground and/or neutral line are coupled to the outlet.

As a result of the two 110 volt power lines, a transmitter connected into a single 110 volt socket can only readily transmit its signals to other sockets and devices operating off the same power line. Thus, approximately one half of a household's sockets and appliances plugged therein or otherwise connected to the household wiring can only be controlled by a transmitter plugged into a wall socket.

To get around this problem, purchasers of these systems have had to provide coupling between the power lines at the service (meter) box or circuit breaker panel. For example, a capacitor is coupled between the power lines at the main power panel. These capacitors have a very low impedance at high frequencies and a very high impedance at low frequencies thus permitting only the high frequency control signals to cross between the two power lines. The installation of such a capacitor is not a simple task for a typical householder. Most people, rightly so, are fearful of touching the interior of these power boxes. Thus, a professional installer is often required to install the capacitor.

This and other drawbacks of the prior art are overcome by the present invention which is described below.

SUMMARY OF THE INVENTION

The present invention comprises an electrical coupler capable of being simply plugged into a 220 volt socket in a household. The coupler provides high frequency coupling between the power lines such that a high frequency control signal in the KHz range, passes between the power lines. Low frequency current, such as an alternating current having a frequency under 500 Hz, and particularly around 60 Hz, is substantially blocked by the coupling.

The present invention in the currently preferred embodiment has a female receptacle and a male plug. The plug engages a standard 220 volt outlet, the female receptacle receives a standard 220 plug such as found on a household appliance, and that would, but for the invented coupler, be directly plugged into the 220 volt outlet.

Accordingly, it is an object of the present invention to provide a simple, easy and convenient way to link the entire wiring of a household together for purposes of providing a network for communication and control of devices electrically connected to the electrical wiring of a household.

It is another object of the present invention to provide a device as described above which does not require installation by an electrician or otherwise require the installation of a special electrical connection at the power box of a household.

BRIEF DESCRIPTION OF THE DRAWINGS

FIG. 1 is a perspective view a preferred embodiment of the invented power coupler.

FIG. 2 is a sectional view of the invented coupler, taken sections through lines 2—2 of FIG. 1.

FIG. 3 is an electrical schematic view of the invention coupler.

DETAILED DESCRIPTION OF THE INVENTION

As shown in FIGS. 1 and 2, the currently preferred embodiment of the invented coupler 10 comprises a generally cylindrical elongated housing 12 having a first circular end 14 and a second (opposite) circular end 16. Disposed within the first end 14 is a female connector (receptacle) for a 220 volt plug comprising a first power prong receiving slot 18, a second power prong receiving slot 20 and a ground prong receiving slot 22. Disposed on the second end 16 is a first male power connector or prong 28, a second male power connector or prong 30 and ground connector or prong 32. A first power line conductor 23 connects the first slot 18 with the prong 28. Similarly, a second conductor 25 connects the second slot 20 with the prong 30. And finally, a third conductor 27 connects the third slot 22 with the prong 32. The housing and conductor may be made from common materials used for fabricating plugs, receptacles and electrical adaptors. While a generally cylindrical housing is shown, the shape of the coupler is critical to the present invention.

The coupler 10 includes coupling means 35, which electrically connects the first and second power line conductors 23 and 25. The coupling means 35 which is disposed within the housing 10, permits the transfer of high frequency signals between the two power conductors while impeding the transfer of the low frequency alternating current. More specifically, the coupling means 35 conducts a high frequency electrical signal in the KHz range, but low frequency current, such as an alternating current having a frequency under 500 Hz, and particularly around 60 Hz, is substantially impeded. The interconnecting means is in the currently preferred embodiment is a capacitor. A capacitor having capacitance of approximately 1.0 microf and one able to withstand the peak-to-peak voltage between the power lines is adequate. Other coupling means which include inductors, transformers or active devices may be used to provide the requisite high frequency-low impedance, and low frequency-high impedance characteristics of the coupling means. The specific capacitor, inductor, transformer or active devices and combinations thereof, may be selected by a person of ordinary skill in the art.

While it is preferred, it is not necessary that the invented coupler have a female receptacle. For instance, if any 220 volt outlet in a particular household is not utilized, only the male portion of the present invention needs to be provided.

In use, the invented coupler is simply plugged into any 220 volt outlet in a household, and optionally, a 220 volt appliance is plugged into the receptacle portion of the invention. PLC coupling is provided by the coupling means 35.

FIG. 3 shows the electrical connections for the described embodiment. The conductor 12 is shown as an ordinary wire, for example, a red coded wire, the ground as a wire 27 again, by way of example a green coded wire and the other power line has a black coded wire 23. The coupling means 35 of FIG. 2 is shown as a capacitor 50 in FIG. 3.

In the above described embodiment, the invented coupler is for a standard outlet having two power lines and a ground. In some cases the receptacle and mating plug may have two power lines and a neutral line, or two power lines, a neutral and a ground line. In these cases, the male and female ends of the invented coupler are configured to engage for example, a wall plug having four prongs and to provide a receptacle for four prongs. In these cases, once again, a coupling means, such as capacitor is coupled between the power lines. In other cases, the invented coupler may be used in a three phase power system. Here, a plurality of capacitors are used to interconnect the power lines. For example, a Δ (3 capacitors) configuration of capacitors may be interconnected between the three power lines or a "Y" comprising 3 capacitors may be used to interconnect the power lines.

Thus, a coupler has been disclosed which permits power line communications to be coupled between the power lines without the need for entering and/or modifying power equipment such as a power box, meter box, circuit breaker panel enclosure, or the like.

I claim:
1. An electrical coupler comprising:
   a generally cylindrical housing;
   a male portion disposed in one end of said housing and comprising first and second power line prongs and an additional line prong for engaging a 220 volt receptacle;
   a female portion disposed at the other end of said housing and comprising first and second power prong receiving slots and an additional prong receiving slot for mating with a 220 volt plug and electrically connected to said first and second prongs and said additional line prong, respectively;
   coupling means electrically connected between said first and second power line prongs for providing a high impedance to low frequency alternating current and low impedance to high frequency electrical signals for coupling high frequency communication signals between said first and second power line prongs.

2. The coupler of claim 1 wherein said coupling means comprises a capacitor.

3. The coupler defined by claim 1 or 2 wherein said additional line prong is for a neutral line.

4. The coupler defined by claim 1 or 2 wherein said additional line prong is for a ground line.

* * * * *